United States Patent [19]

Seki et al.

[11] Patent Number: 5,155,425
[45] Date of Patent: Oct. 13, 1992

[54] NC DATA EXECUTION METHOD

[75] Inventors: Masaki Seki, Suginami; Takashi Takegahara, Hachioji; Masatoshi Nakajima, Oshino, all of Japan

[73] Assignee: Fanuc Ltd., Minamitsuru, Japan

[21] Appl. No.: 640,426

[22] PCT Filed: Jun. 4, 1990

[86] PCT No.: PCT/JP90/00722
§ 371 Date: Jan. 14, 1991
§ 102(e) Date: Jan. 14, 1991

[87] PCT Pub. No.: WO91/00557
PCT Pub. Date: Jan. 10, 1991

[30] Foreign Application Priority Data

Jun. 29, 1989 [JP] Japan .................. 64-165327

[51] Int. Cl.$^5$ ............................ G05B 19/405
[52] U.S. Cl. ....................... 318/571; 318/567; 318/572; 364/474.11; 364/474.12
[58] Field of Search .............. 318/560-636; 364/513, 474

[56] References Cited

U.S. PATENT DOCUMENTS

| 3,582,896 | 6/1971 | Suber .................. 340/172.5 |
| 3,986,010 | 10/1976 | Lankford et al. ........... 318/572 |
| 4,055,787 | 10/1977 | Beadle et al. ............. 318/591 |
| 4,214,823 | 7/1980 | Pritchard ................. 318/568 |
| 4,262,336 | 4/1981 | Pritchard ................. 318/696 |
| 4,328,550 | 5/1982 | Weber .................. 318/568 X |
| 4,449,196 | 5/1984 | Pritchard ............... 364/900 X |
| 4,456,951 | 6/1984 | Henneberger et al. ..... 364/200 X |
| 4,497,029 | 1/1985 | Kiyokawa ................ 318/572 X |
| 4,506,321 | 3/1985 | Comstock et al. ......... 318/571 X |
| 4,550,378 | 10/1985 | Nozawa et al. ........... 318/565 X |
| 4,597,040 | 6/1986 | Buizer .................. 364/170 |
| 4,604,560 | 8/1986 | Inagaki et al. ............ 318/567 |
| 4,639,653 | 1/1987 | Anderson et al. .......... 318/599 |
| 4,663,730 | 5/1987 | Ikeda ................... 364/900 |
| 4,751,442 | 6/1988 | Kurakake ................ 318/567 |
| 4,931,709 | 6/1990 | Ikeda et al. ............. 318/567 |
| 5,025,385 | 6/1991 | Froyd .................. 364/474.11 |

Primary Examiner—Paul Ip
Attorney, Agent, or Firm—Staas & Halsey

[57] ABSTRACT

An NC data execution method which permits an efficient checking of the validity/invalidity of NC data through a simple operation. In an NC data execution process, a processor of an automatic programming apparatus reads out NC data, block by block, from a memory (S2), and determines whether or not the read NC data block satisfies an NC data execution interrupt condition, e.g., whether or not the data block contains a specific code (S3). When the interrupt condition is fulfilled, the data block is displayed at an input display field on the screen (S4), and then the NC data execution, including a graphic display operation based on the content of the data block satisfying the interrupt condition, e.g., a display of a tool path and the reading and display of the next block, is automatically interrupted, whereby the operator is allowed to thoroughly check the data block satisfying the interrupt condition. After the data checking, the NC data execution is restarted upon input of an interrupt disable command through the operator's key operation (S5–S7).

12 Claims, 5 Drawing Sheets

F I G. I

F I G. 2

| EXECUTION INTERRUPT CONDITION | ON | OFF |
|---|---|---|
| EACH BLOCK | | ○ |
| EACH SCREEN | | ○ |
| ⋮ | | ⋮ |
| CODE G00 | | ○ |
| CODE G01 | ○ | |
| CODE G02 | | ○ |
| ⋮ | | ⋮ |
| PRELIMINARY CODE T | | ○ |
| PRELIMINARY CODE H | | ○ |
| PRELIMINARY CODE D | | ○ |
| ⋮ | | ⋮ |

FIG.6

```
01234;
G92X10. Y20. Z0.;
G90G00X15. Y23.;
G01X25. Y-5.;
X41. 5Y30. 5;
X50. Y45.
G00X15. Y23.;
Step=G01Y35.;
```

Step=G00X15. Y23.;
```

NC DATA EXECUTION METHOD

TECHNICAL FIELD

The more present invention relates to an NC data execution method which permits an efficient validity-/invalidity checking of NC data through a simple operation.

BACKGROUND ART

It is conventionally known to display created numerical control (NC) data on a screen of, e.g., an automatic programming apparatus for operator's visual inspection for validity/invalidity checking of the NC data. NC data is usually large in data quantity and cannot be displayed on the screen at one time. Conventionally, therefore, NC data corresponding to one screen capacity is first displayed and checked, and then next NC data corresponding to one screen capacity is displayed on the screen. Accordingly, the execution of the NC data is temporarily stopped while the NC data corresponding to one screen capacity is displayed, and the execution of the NC data for the next screen display is restarted only after the checking of the preceding data is completed. In case that NC data is displayed screen by screen as mentioned above, it is sometimes difficult for the operator to recognize the relation of the NC data that appears in different screens. To reduce this inconvenience, an attempt has been made to display the NC data block at the beginning of the next screen, in addition to the currently displayed NC data, as shown is FIG. 6.

As NC data consists of data items of different importance, the operator pays special attention to specific NC data items of great importance, when checking the validity/invalidity of the NC data. According to the aforesaid conventional method, however, since NC data corresponding to one screen capacity is displayed on the screen at one time, it is difficult to visually identify the specific data among a large number of data items.

An NC data execution method capable of reducing the above difficulty is also known, in which after the checking of one block of NC data displayed on the screen is completed, the next block of NC data is displayed (FIG. 7), whereby the operator's burden associated with visual checking is more or less reduced. According to this conventional method, however, the execution of NC data is interrupted each time one block of NC data is displayed. Thus, the operator must operate the automatic programming apparatus each time the checking of one NC data block is completed, to restart the execution of the NC data for display of the next data bock, thus making an efficient checking operation difficult.

DISCLOSURE OF THE INVENTION

An object of the present invention is to provide an NC data execution method which permits an efficient valadity/invalidity checking of NC data through a simple operation.

To achieve the above object, an NC data execution method of the present invention comprises the steps of: (a) presetting an interrupt condition in an automatic programming apparatus; (b) reading out NC data, block by block, by the automatic programming apparatus and successively displaying the NC on a display screen; (c) determining whether or not a read block of the NC data satisfies the interrupt condition, each time one block of the NC data is read out and displayed: (d) determining whether or not an interrupt disable command is input to the automatic programming apparatus; and (e) interrupting execution of the NC data performed by the automatic programming apparatus when it is determined that the interrupt condition is fullfilled, until input of the interrupt disable command is detected.

As described above, according to the present invention, each item one block of NC data is read out and displayed on the display screen, it is determined whether or not this block of the NC data satisfies the interrupt condition. When the interrupt condition is fulfilled, the execution of the NC data is interrupted until the interrupt disable command is supplied. Accrodingly, the operator can easily identify the specific NC date satisfying the interrupt condition, while viewing the display screen, and hence the validity/invalidity checking of the NC data can be performed efficiently through a simple operation.

BRIEF DESCRIPTION OF THE DRAWINGS

FIG. 2 is a diagram showing a list of candidates for an NC data execution interrupt condition, which is displayed on a graphic display screen in FIG. 1 for selective setting of the interrupt condition:

FIG. 6 is a diagram showing a screen displayed in a prior art method; and

FIG. 7 is a diagram showing another screen displayed in the prior art method.

BEST MODE OF CARRYING OUT THE INVENTION

Figure 1:
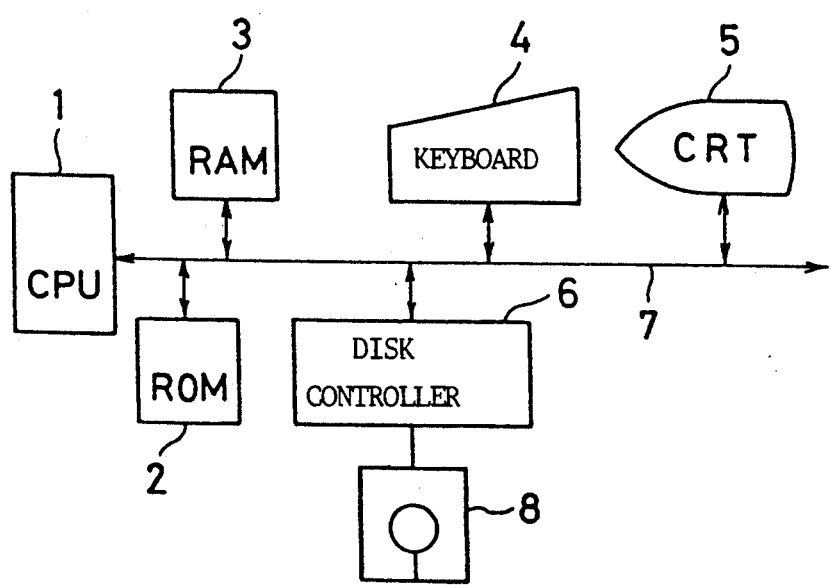
FIG. 1 is a block diagram schematically showing a principal part of an automatic programming apparatus for embodying an NC data execution method according to one embodiment of the present invention.

Referring to FIG. 1, an automatic programming apparatus for embodying an NC data execution method of an embodiment of the present invention comprises a processor (CPU) 1 for executing a control program, a read-only memory (ROM) 2 storing the control program, and a random-access memory (RAM) 3 for storing e.g., various data, a system program, the later-mentioned conditions for interrupting the execution of NC data. The automatic programming apparatus further comprises a keyboard 4, a graphic display unit (CRT) 5, and a disk controller 6. These elements 2 to 6 are connected to the CPU 1 through busses 7. Various system programs, including the later-mentioned NC data execution program, and previously created NC data are saved in a floppy disk 8 which is located in the disk controller 6.

In the system program for the NC data execution, there are prepared, as candidates for conditions (hereinafter referred to as interrupt conditions) for interrupting the NC data execution, and "end of one block," an "end of NC data corresponding to one screen capacity," and an "inclusion of a specific instruction code in NC data," for instance. Specific instruction codes include various G codes associated with preparatory functions of a numerical control apparatus, a miscellaneous code T associated with replacement of tools, a miscellaneous code H associated with tool length correction, a miscellaneous code D associated with tool diameter correction, and the like. When the automatic programming apparatus is operated in accordance with the NC data execution program, a list of the candidates for the interrupt conditions (FIG. 2) is displayed on the screen of the CTR 5. Referring to this list, the operator operates the keyboard 5 to set each of the candidates on the list in an "effective (ON)" of "ineffective (OFF)" state. One or more interrupt conditions selectively rendered to be "effective" by the operator are stored in the RAM 3 as the "NC data execution interrupt conditions."

Now, an NC data execution process executed by the automatic programming apparatus for the NC data shown in FIG. 6 will be described through the example wherein the "inclusion of a linear interpolation command code GO1 in NC data" is selected as the interrupt condition.

Figure 3:
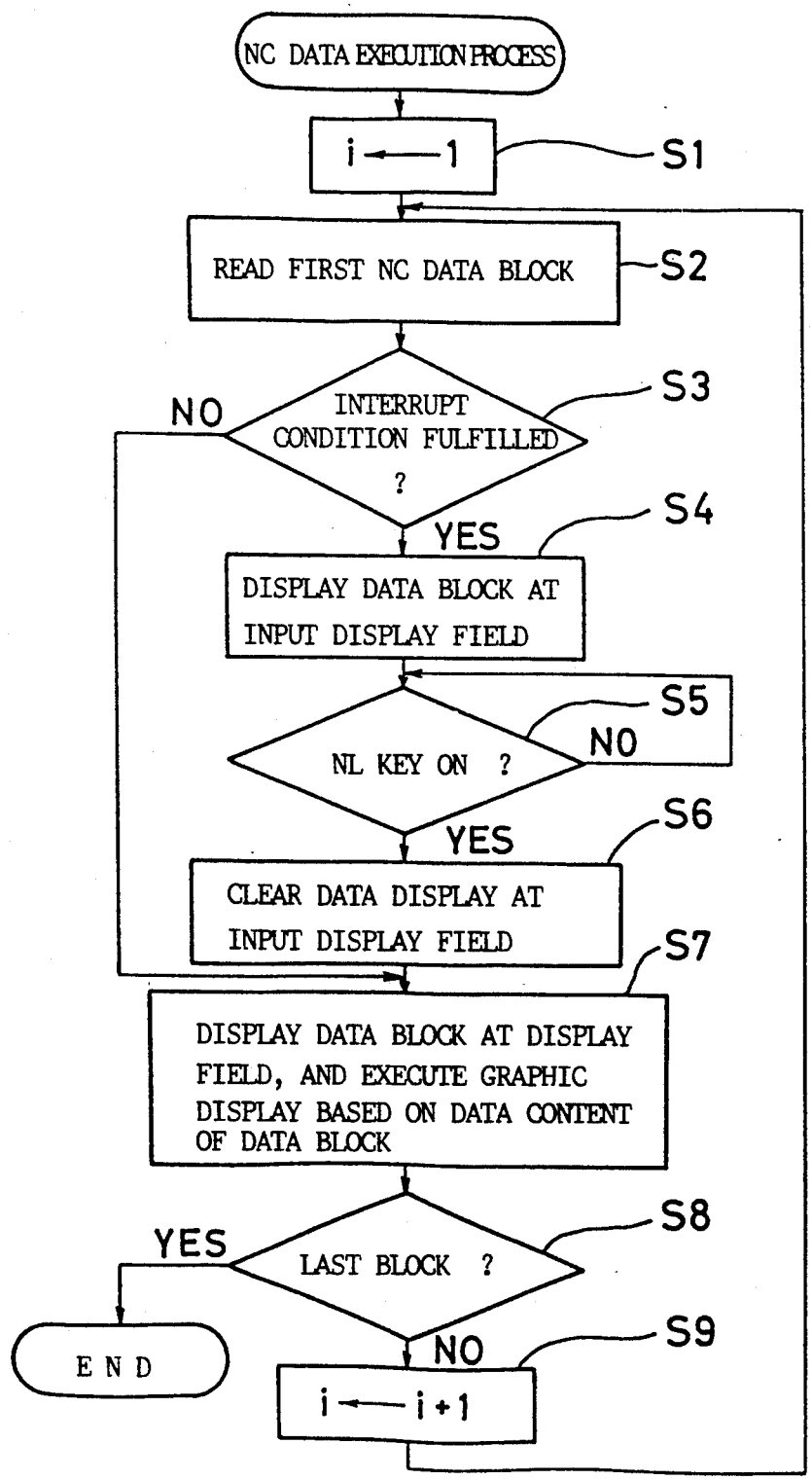
FIG. 3 is a flowchart of an NC data execution process executed by a processor shown in FIG. 1.

As shown in FIG. 3, at the start of the NC data execution process, the CPU 1 of the automatic programming apparatus sets an index i to a value of "1" (Step S1), and reads out the first block "01234" of the NC data stored in the RAM 3, in accordance with the value "1" of the index i (Step S2). The CPU 1 then determines whether or not the thus-read block of the NC data satisfies the interrupt conditon (Step S3). The NC data block "01234;" consists of the program number "1234" and the code "0" definitely determining the program number. Since this block does not contain the code "GO1," the result of determination in Step S3 is negative, and thus Step S7 is entered. In Step S7, the NC data "01234;" read out in Step S2 is displayed at the first line in a display field 5'a of the CRT screen 5', under the control of the CPU 1. In Step S8 following Step S7, the CPU 1 determines whether or not the NC data block read in Step S2 is the last NC data block indicating a program end. In this case, the determination in Step S8 is negative, and accordingly, the value of the index i is incremented by "1" in Step S9. and the program returns to Step S2.

In Step S2, the second NC data block "G92X10.Y20.Z0;" corresponding to the value (=2) of the index i is read out. This NC data block consists of the code "G92" for establishing a work coordinate system, and the data "X10. Y20.Z0" for setting the origin point in a tool path display field of the CRT screen, and thus does not contain the code "GO1". Accordingly, the determination in Step S3 is negative, and thus the program proceeds to Step S7 in which the NC data block "G92X10.Y20.Z0;" is displayed at the second line in the display field 5'a of the CRT screen. Since the determination in Step S8 is also negative, the value of the index i is incremented in Step S9, and the program returns to Step S2.

Figure 4:
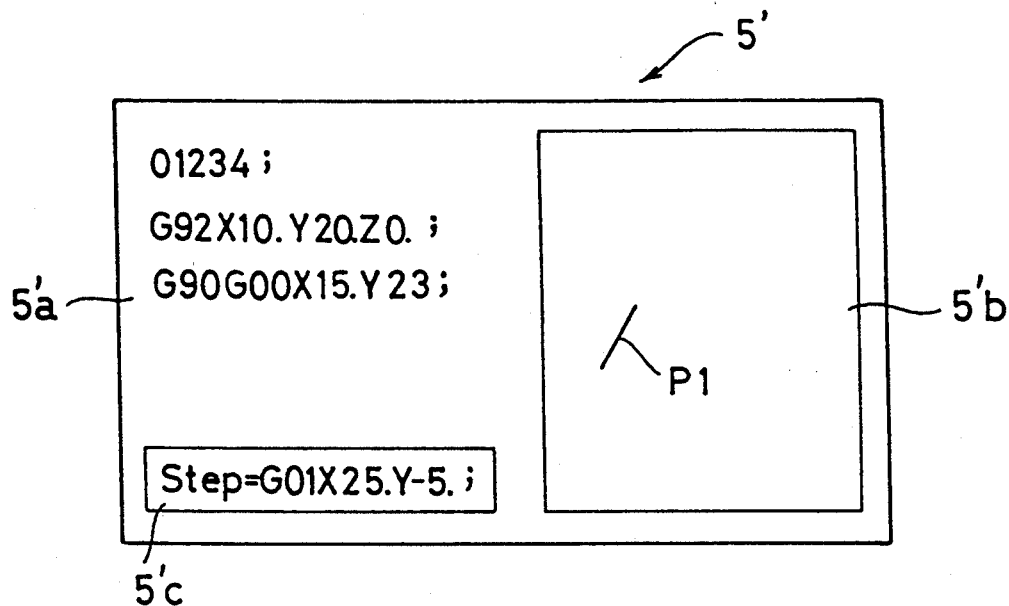
FIG. 4 is a diagram showing, by way of example, a screen displayed in the NC data execution process.

Next, the third NC data block "G90G00X15.Y23.;" corresponding to the index i (=3) is read out (step S2); This NC data block does not satisfy the interrupt condition, and therefore, Step S7 is entered wherein the NC data block "G90G00X15.Y23.;" is displayed at the third line of the display field 5'a on the CTR screen. Simultaneously, based on the data content of this NC data block, a tool path P1 extending from the origin (10, 20, 0) of the work coordinate system to a machining start position (15, 23, 0) is displayed in the tool path display field 5'b (see FIG. 4). Then, after executing Steps S8 and S9, the program returns to Step S2.

The fourth NC data block "G01X25.Y-5.;" read out next contains the code "01" and accordingly, satisfies the interrupt condition. When it is determined in Step S3 that the interrupt condition is fulfilled, the CPU 1 displays the NC data block "G01X25.Y-5.;" at the input display field 5'c on the CRT screen, and then stands by for input of an interrupt disable command (Steps S4 and S5). Consequently, the execution of NC data (namely, the display of the tool path in accordance with the content of the NC data block satisfying the interrupt condition, and the reading and display of the subsequent NC data block) is inhibited after the display of the NC block satisfying the interrupt condition (see FIG. 4).

While the exection of the NC data is interrupted, the operator can check the NC data block displayed in the input display field 5'c of the CRT screen. If, after checking the content of the NC data block, it is found to be proper, the operator depresses a new-line key (NL key) of the keyboard 4 to input the interrupt disable command to the automatic programming apparatus, so as to restart the execution of the NC data.

Figure 5:
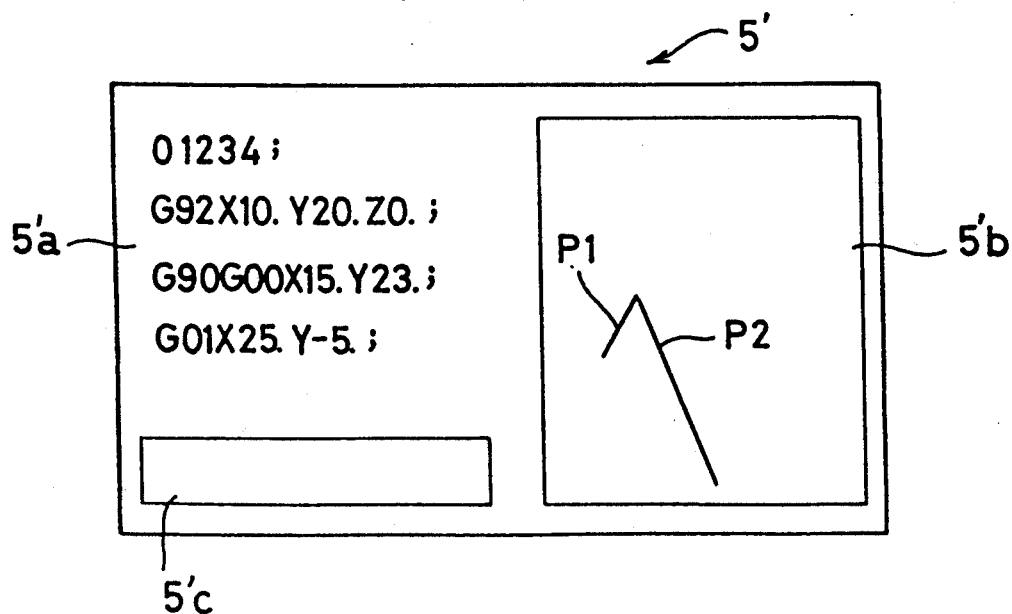
FIG. 5 is a diagram showing another example of the screen displayed.

When it is detemined in Step S5 that the interrupt disable command has been input, the CPU 1 restarts the NC data execution. Namely, the CPU causes the display of the NC data block "G01X25.Y-5.;" on the input display field to be cleared (Step S6). Then, as shown in FIG. 5, this NC data block is displayed in the display field 5'a of the CRT screen, and a tool path P2, extending from the machining start position (15, 23, 0) to a position (25, −5, 0) and generated by a linear interpolation in accordance with the data concerned, is displayed in the tool path display field 5'b (Step S7).

Thereafter, the CPU 1 reads out the NC data, block by block, from the RAM 3, and determines whether or not the thus-read NC data block satisfies the interrupt condition, as mentioned above. If the interrupt condition is not fulfilled, the NC data block read in Step S2 is displayed in the display field 5'a of the CRT screen, and a tool path generated based on the content of this NC data block is displayed in the tool path display field 5'b of the CRT screen. When this display field is fully occupied, the data in the display field is scrolled up. If the NC data block read out in Step S2 satisfies the interrupt condition, this data block is displayed at the input display field on the CRT screen, and then the NC data execution is suspended until the interrupt disable command is input.

When the last NC data block indicative of the program end being read is detected in Step S8, the CPU 1 determines that the checking of all the NC data blocks has been completed, and thus terminates the NC data execution process.

The present invention is not limited to the foregoing embodiment, and various modifications thereof may be made. For example, although in the embodiment, an "inclusion of the code GO1 in the NC data block" is discriminated as the interrupt condition, the interrupt condition may alternatively be an "inclusion of one or more arbitrary codes other than the code GO1 in the NC data block."

We claim:

1. An NC data execution method performed with an automatic programming apparatus, comprising the steps of:

(a) presetting an interrupt condition in the automatic programming apparatus;

(b) reading out NC data, block by block, with the automatic programming apparatus and successively displaying the NC data for machining and a tool path for machining that would be created by execution of said NC data on a display sceen;

(c) determining whether or not each block of the NC data satisfies the interrupt condition, each time each block of the NC data is read out and displayed;

(d) determining whether or not an interrupt disable command is input to the automatic programming apparatus; and (e) interrupting the execution of the NC data by the automatic programming apparatus upon determination in said step (c) that the interrupt condition is fulfilled, until input of the interrupt disable command is detected by the automatic programming apparatus.

2. An NC data execution method according to claim 1, wherein at least one code representative of the interrupt condition is set in said step (a), and upon determination in said step (c) that the interrupt condition is fulfilled, when the block of the NC data that is read contains said at least one code.

3. An NC data execution method according to claim 1, wherein the interruption of the execution of the NC data in said step (e) comprises an inhibition of reading a block of the NC data which follows that block of the NC data which satisfies the interrupt condition.

4. An NC data execution method according to claim 1, wherein the interruption of the execution of the NC data in said step (e) comprises an inhibition of an on-screen displaying process in accordance with the block of the NC data satisfying the interrupt condition.

5. An NC data execution method performed with an automatic programming apparatus, comprising the steps of:

(a) presetting an interrupt condition in the automatic programming apparatus;

(b) reading out NC data, block by block, with the automatic programming apparatus and successively displaying the NC data on a display screen along with a machining path obtainable by execution of the NC data;

(c) determining whether or not each block of the NC data satisfies the interrupt condition, each time each block of the NC data is read out and displayed;

(d) determining whether or not an interrupt disable command is input to the automatic programming apparatus; and (e) interrupting display of the NC data and the machining path by the automatic programming apparatus upon determination in said step (c) that the interrupt condition is fulfilled, until input of the interrupt disable command is detected by the automatic programming apparatus.

6. An NC data execution method according to claim 5, wherein at least one code representative of the interrupt condition is set in said step (a), and upon determination in said step (c) that the interrupt condition is fulfilled, when the block of the NC data that is read contains said at least one code.

7. An NC data execution method according to claim 5, wherein the interruption of the execution of the NC data in said step (e) comprises an inhibition of reading a block of the NC data which follows that block of the NC data which satisfies the interrupt condition.

8. An NC data execution method according to claim 5, wherein the interruption of the execution of the NC data in said step (e) comprises and inhibition of an on screen displaying process in accordance with the block of the NC data satisfying the interrupt condition.

9. An AC data execution method performed with an automatic programming apparatus, comprising the steps of:

(a) presetting an interrupt condition in the automatic programming apparatus;

(b) reading out NC data, block by block, with the automatic programming apparatus and successively displaying the NC data on a display screen along with a machining path obtainable by execution of the NC data;

(c) determining whether or not each block of the NC data satisfies the interrupt condition, each time each block of the NC data is read out and displayed;

(d) determining whether or not an interrupt disable command is input to the automatic programming apparatus;

(e) interrupting display of the NC data and the machining path by the automatic programming apparatus upon determination that the interrupt condition is fulfilled, until input of the interrupt disable command is detected by the automatic programming apparatus; and (f) performing machining in accordance with the NC data along a path corresponding to the machining path displayed.

10. An NC data execution method according to claim 9, wherein at least one code representative of the interrupt condition is set in said step (a), and upon determination in said step (c) that the interrupt condition is fulfilled, when the block of the NC data that is read contains said at least one code.

11. An NC data execution method according to claim 9, wherein the interruption of the execution of the NC data in said step (e) comprises an inhibition of reading a block of the NC data which follows that block of the NC data which satisfies the interrupt condition.

12. An NC date execution method according to claim 9, wherein the interruption of the execution of the NC data in said step (e) comprises and inhibition of an on screen displaying process in accordance with the block of the NC data satisfying the interrupt condition.

* * * * *

UNITED STATES PATENT AND TRADEMARK OFFICE
CERTIFICATE OF CORRECTION

PATENT NO. : 5,155,425

DATED : OCTOBER 13, 1992

INVENTOR(S) : MASAKI SEKI ET AL.

It is certified that error appears in the above-identified patent and that said Letters Patent is hereby corrected as shown below:

TITLE PAGE, ITEM [57] ABSTRACT line  4, "prccessor" should be --processor.

Col. 1,   line  5, "more" should be deleted;
        line 53, "bock" should be --block--.

Col. 2,   line  9, "item" should be --time--;
        line 16, "crodingly," should be --cordingly,--;
        line 29, "condition:" should be --condition;--.

Col. 3,   line  8, "CTR" should be --CRT--;
        line 62, "CTR" should be --CRT--.

Col. 4,   line  2, " "01" " should be --"G01"--.

Col. 5,   line  3, "sceen;" to --screen;--.

Col. 6,   line 52, "date" should be --data--.

Signed and Sealed this

Twelfth Day of October, 1993

Attest:

BRUCE LEHMAN

*Attesting Officer*       *Commissioner of Patents and Trademarks*